United States Patent [19]

Gellert

[11] Patent Number: 4,586,887
[45] Date of Patent: May 6, 1986

[54] INJECTION MOLDING NOZZLE PROBE AND STACK MOLDING APPARATUS

[76] Inventor: Jobst U. Gellert, 7A Prince St., Georgetown, Ontario, Canada, L7G 2X1

[21] Appl. No.: 619,784

[22] Filed: Jun. 11, 1984

[30] Foreign Application Priority Data

May 25, 1984 [CA] Canada .................................. 455174

[51] Int. Cl.⁴ ............................................ B29C 45/22
[52] U.S. Cl. ................................. 425/144; 264/328.15;
425/378 R; 425/379 R; 425/549; 425/570; 425/572
[58] Field of Search ........... 425/547, 549, 144, 378 R, 425/379 R, 548, 143, 568, 570, 572; 264/328.15, 328.14

[56] References Cited

U.S. PATENT DOCUMENTS

| 3,141,915 | 7/1964 | Nieuwenhuis et al. | 425/547 |
|---|---|---|---|
| 3,674,407 | 7/1972 | Neuhaus | 425/547 |
| 3,800,027 | 3/1974 | Tsutsumi | 425/547 |
| 3,970,821 | 7/1976 | Crandell | 219/523 |
| 4,161,386 | 7/1979 | Osuna-Diaz | 425/547 |
| 4,212,626 | 7/1980 | Gellert | 425/562 |
| 4,230,934 | 10/1980 | ter Beek et al. | 425/547 |
| 4,376,244 | 3/1983 | Gellert | 425/549 |
| 4,433,969 | 2/1984 | Gellert | 425/549 |
| 4,516,927 | 5/1985 | Yoshida | 425/568 |
| 4,517,453 | 5/1985 | Tsutsumi | 425/548 |

FOREIGN PATENT DOCUMENTS 5769184 10/1980 Japan .

Primary Examiner—Jay H. Woo
Assistant Examiner—Timothy W. Heitbrink
Attorney, Agent, or Firm—Riches, McKenzie & Herbert

[57] ABSTRACT

This invention relates to an improved heated nozzle probe for injection molding and an improved stack molding system in which it is used. Each nozzle probe has an inner helical shaped heating element which extends into the pointed tip, and a separate outer one which does not. In addition to providing more heat to the pointed tip, this has the advantage that a standard unit can be used for various applications. In the stack molding system, two heated nozzles are arranged in alignment to bridge the parting line and the pointed tip of only the downstream one is heated. Combined with tapering the aligned gates to gradually increase in diameter in a downstream direction, this has been found to considerably reduce stringing and drooling problems as the mold opens for ejection.

4 Claims, 6 Drawing Figures

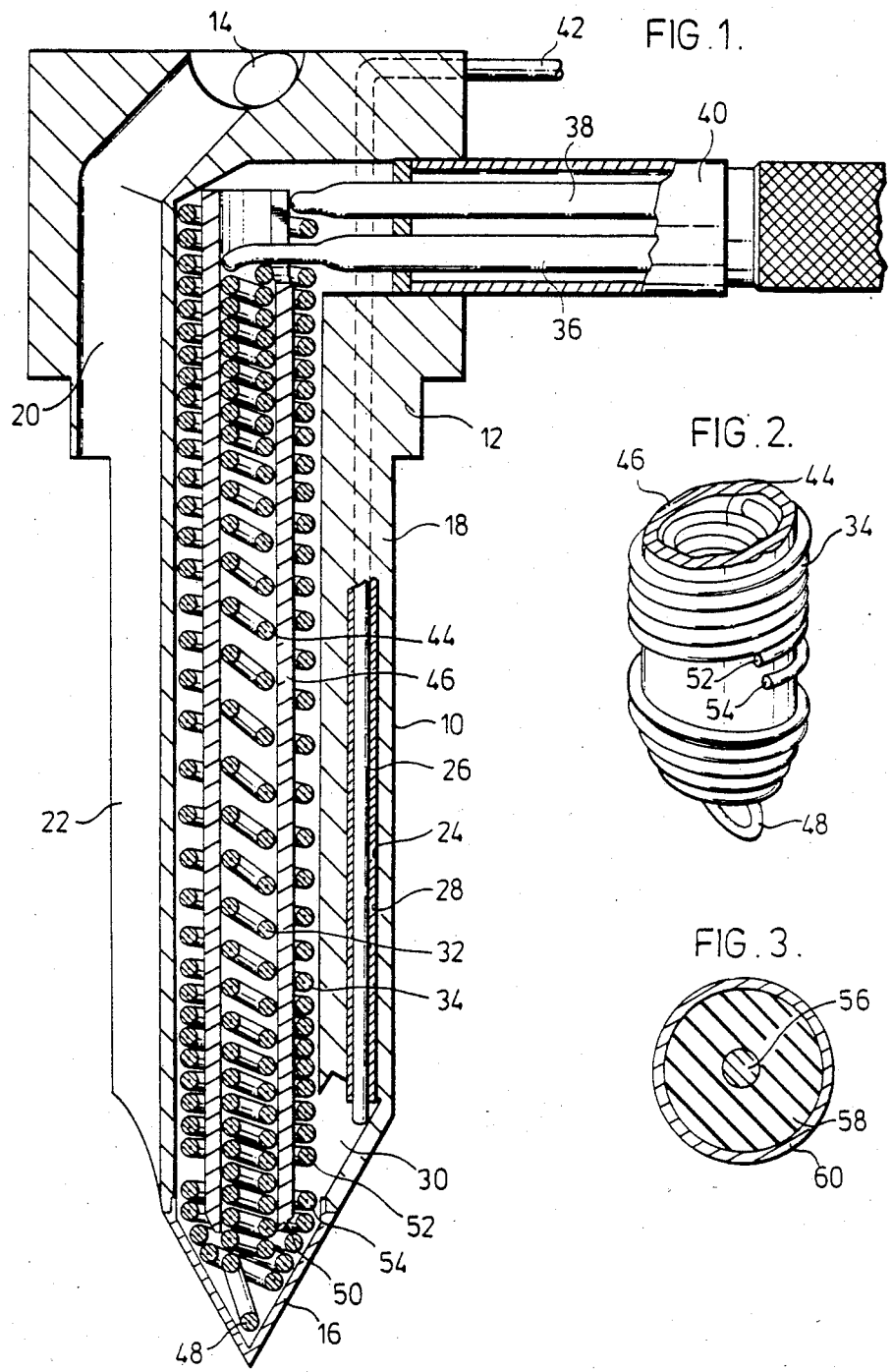

INJECTION MOLDING NOZZLE PROBE AND STACK MOLDING APPARATUS

BACKGROUND OF THE INVENTION

This invention relates to injection molding and more particularly to an improved heated nozzle probe and a stack molding system incorporating it.

Elongated nozzle probes having internal electrical heaters are well known for use in injection molding. Normally, the heated probe is seated to extend into the melt passage and the pressurized melt flows around or along it to the gate. An early example of this is shown in U.S. Pat. No. 3,970,821 to Crandell which issued July 20, 1976. Another example is disclosed in the applicant's U.S. Pat. No. 4,376,244 which issued Mar. 8, 1983 in which a heater member is cast into a well in an outer body. Yet another example of a nozzle probe is shown in Japanese Utility Patent Application No. 57-69184 to Yoshida filed Oct. 11, 1980. More recently, the applicant's U.S. patent application Ser. No. 453,572 entitled "Method of Manufacture of an Injection Molding Integral Heated Probe" filed Dec. 27, 1982, and now abandoned, discloses an improved nozzle probe in which the melt flows through externally open melt channels and a thermocouple extends into the copper filler to more accurately measure the temperature adjacent the tip end.

As mentioned in these previous patents and applications, it is also well known that temperature control of the melt as it flows along the nozzle probe and particularly in the gate area is critical to the successful operation of the system. Despite this fact, almost all of these previous nozzle probes disclose only the use of a single heating element to maintain and control the temperature of the melt flowing along to the gate.

The applicant has now unexpectedly discovered an improved nozzle probe having two separate heating elements which provides improved temperature control, as well as improved apparatus for stack molding which utilizes these nozzle probes and does not require a valve gate. Valve gated stack molding is known in the art, as shown by the applicant's U.S. Pat. No. 4,212,626 which issued July 15, 1980. U.S. Pat. No. 3,800,027 to Tsutsumi which issued Mar. 26, 1974 does show a nozzle probe with two separate heaters or heating elements. However, in order to control the flow of melt through the gate it is necessary to intermittently energize one of the elements which extends into the gate according to a predetermined cycle. While this is satisfactory for some applications, it has the problem that cycle speed is limited by the time it takes the element to heat and cool.

SUMMARY OF THE INVENTION

Accordingly, it is an object of the invention to at least partially overcome these disadvantages of the prior art by providing an improved nozzle probe having two separate heating elements, neither of which require intermittent energization. Another object is to provide improved stack molding apparatus which does not require valve gating.

To this end, in one of its aspects, the invention provides an integral elongated heated nozzle probe to be seated in an injection molding system to convey melt towards a gate, comprising an elongated body having a melt receiving inlet at one end and a pointed tip at the other end to be aligned with the gate, the body having at least one melt passage which extends longitudinally from the inlet at said one end and becomes an outwardly open melt channel towards said other end; a first electrically insulated heating element surrounded by a highly conductive material cast into the body, the first heating element extending from first external terminal means adjacent the inlet, along the melt passage and melt channel, and into the pointed tip; a second electrically insulated heating element surrounded by a highly conductive material cast into the body, the second heating element extending from second external terminal means adjacent the inlet, along the melt passage and melt channel, and terminating short of the pointed tip; and a source of electrical power with control means connected to the first and second terminal means, whereby for any particular application or location of the nozzle probe in the system either or both of the first and second heating elements can be activated, thereby providing more or less heat along the melt passage and melt channel and particularly to the pointed tip of the nozzle probe.

In another of its aspects, the invention further provides stack injection molding apparatus for conducting melt from a fixed platen to a movable platen which are actuated according to an operating cycle between open and closed positions, comprising a first heated elongated nozzle probe seated in the fixed platen having a pointed tip in alignment with a first gate extending through the fixed platen, the first nozzle probe having at least one melt passage extending to convey pressurized melt from an inlet to the first gate through the fixed platen; and a second heated elongated nozzle probe seated in the movable platen having a pointed tip in alignment with a second gate extending through the movable platen, the first gate through the fixed platen connecting with the second gate through the movable platen in the closed position, the second nozzle probe having at least one melt passage extending to convey pressurized melt from the second gate to a melt duct in the movable platen; the second nozzle probe having heating means for heating the pointed tip of the second nozzle probe to a higher temperature than the pointed tip of the first nozzle probe, whereby stringing of the melt is reduced when the movable platen is actuated to the open position.

Further objects and advantages of the invention will appear from the following description taken together with the accompanying drawings.

BRIEF DESCRIPTION OF THE DRAWINGS

FIG. 1 is a sectional view of a nozzle probe according to one embodiment of the invention;

FIG. 2 is an isometric view showing a portion of the heating elements seen in FIG. 1;

FIG. 3 is a cross-sectional view showing the composition of the heating elements;

DESCRIPTION OF THE PREFERRED EMBODIMENTS

Figure 4:
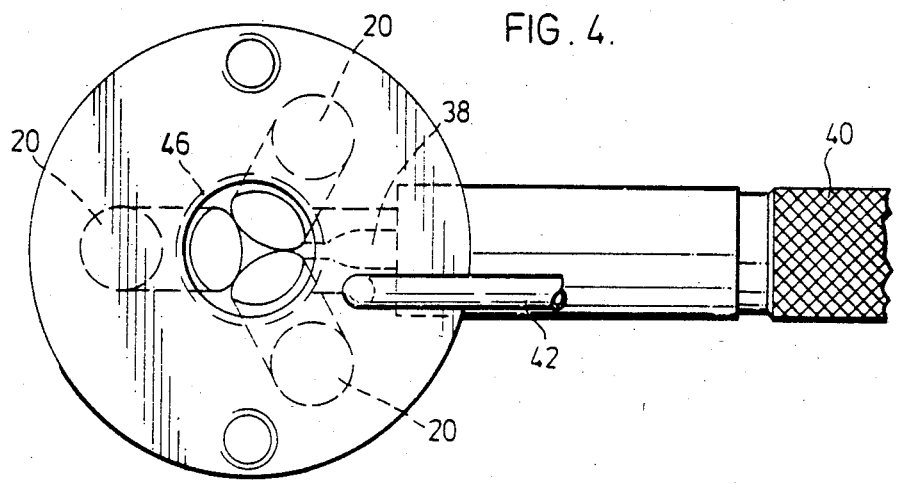
FIG. 4 is a plan view of the nozzle probe seen in FIG. 1 showing the separate melt passages.

Reference is first made to FIG. 1 which shows a nozzle probe 10 for injection molding which has an elongated body 12 with a central inlet 14 at one end and a pointed tip 16 at the other end. The body 12 has a tool steel outer portion 18 through which three spaced melt passages 20 are drilled to extend from the central inlet 14 to connect with outwardly open melt channels 22 extending longitudinally towards the tip 16. These partially open channels are formed by drilling the melt passages 20 entirely through the body outer portion and then machining off a portion of it to expose the channels, as fully described in the applicant's U.S. patent application Ser. No. 453,572 referred to above. Another bore 24 is also drilled longitudinally through the body outer portion 18 to receive a thermocouple 26 which extends through a reducing sleeve 28 into the copper filler 30 adjacent the pointed tip 16. The tip 16 is formed of a high-speed steel conical cap 31 which extends from the outer portion 18. Thus, it may be seen that all of the external surfaces of the nozzle probe which contact the melt are formed of tool steel or other suitable corrosion and abrasion resistant material.

Internally, the nozzle probe 10 has two separate electrical heating elements 32,34 with leads 36,38 which extend to a cold terminal 40 adjacent the melt inlet 14 and the thermocouple lead 42. The first heating element 32 has a helical portion 44 with a number of coils which extends longitudinally inside a central steel locating sleeve 46 and a portion 48 which extends into the pointed tip 16 of the nozzle probe 10 and then out around the end 50 of the locating sleeve. The second heating element 34 has helical coils which extend from the lead 38 along the outside of the locating sleeve 46, and terminates at an end 52 adjacent the end 54 of the first heating element 32. As will be described in more detail below, the second heating element 34 runs along the outside of the locating sleeve 46 towards the pointed tip 16 of the nozzle probe 10, but does not extend into the pointed tip 16 itself. After the heating elements 32,34 are located inside the outer portion 18, a highly conductive copper filler 30 is cast into the remaining space around them and the locating sleeve 46 in a vacuum furnace to form an integral structure in a manner similar to that described in the applicant's U.S. patent application Ser. No. 453,572 referred to above. Vacuum casting bonds or fuses the copper to the heating elements and to the outer portion and eliminates insulative air spaces, thus greatly improving the thermal characteristics of the nozzle probe.

Although not shown in FIG. 1 for ease of illustration, as may be seen in FIG. 3, in this embodiment, the heating elements 32,34 are each low voltage units having a single heating wire 56 extending through an electrical insulating material 58 formed of magnesium oxide powder inside a steel outer casing 60. At the ends 50,52 of the heating elements, some of the magnesium oxide is removed and the central heating wire is welded to the outer casing 60 to ground it. The ends of the casings 60 are, in turn, spot welded to the steel locating sleeve to retain them in position until the copper filler is vacuum cast in around them which, of course, provides a definite ground. While low voltage single wire heating elements have been shown, higher voltage double wire heating elements could also be used.

As is well known, heating elements of this type are normally made by locating the chromalloy heating wire 56 and the magnesium oxide 58 inside the steel casing 60, and then swedging it to reduce its diameter and compact the magnesium oxide to improve its heat transfer characteristics while retaining its electrical insulative effect. Normally, this construction has caused a problem where the swedged elements extend as leads to the cold terminal 40 because they produce too much heat and are too small to handle effectively. In the present case, this difficulty has been overcome by not swedging or only partially swedging the portions of the heating elements which form the leads 36,38 extending to the cold terminal 40. This results in them giving off less undesirable heat in this area and being easier to work with and make connections to.

In use, the nozzle probe 10 is assembled as described above and seated in an injection molding system to receive pressurized melt through the central inlet 14 with the pointed tip 16 in alignment with a gate. The heating elements 32,34 are connected through the cold terminal 40 to a source of electrical power with conventional control means (not shown) to activate either one or both of them depending on the application. If considerable heat is required, then both heating elements are used. If less heat is required, but it is desirable to heat the pointed tip, then the first heating element only is energized. If the material being molded requires even less heat and not in the gate area, then only the second heating element is used. In addition to providing more heat, particularly in the pointed tip 16, for some applications, this double heating element structure has the advantage that it is flexible enough that a standard unit can be used for many different applications. In addition, in some instances, if one of the heating elements burns out the unit may continue to be used by energizing the other heating element.

Figure 6:
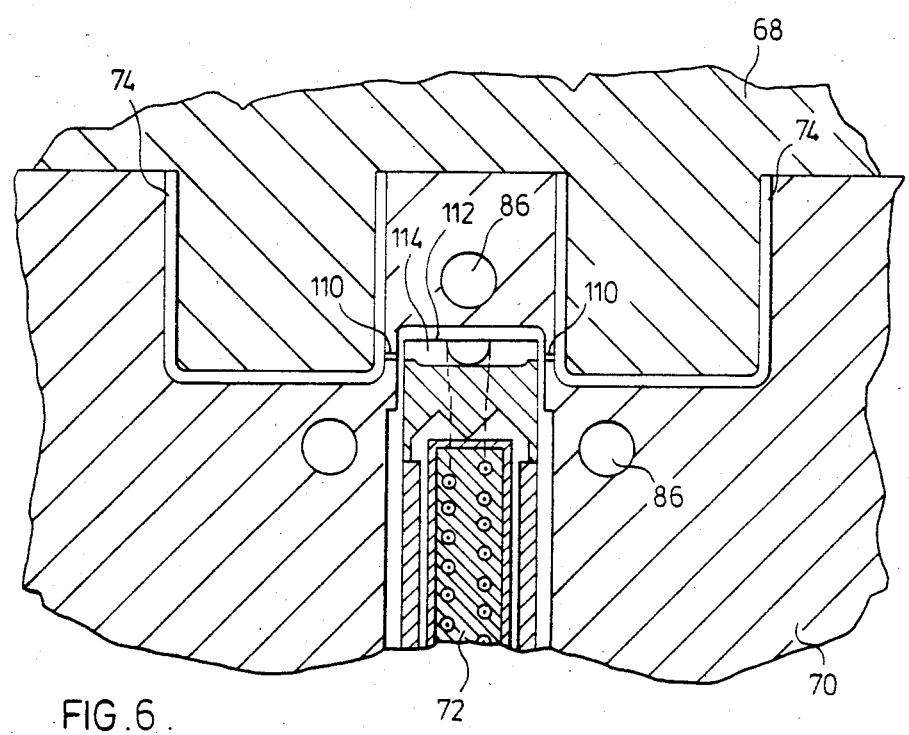
FIG. 6 (located on page with FIG. 4) is a sectional view taken along line 6—6 in FIG. 5 showing the arrangement of the cavities.
Figure 5:
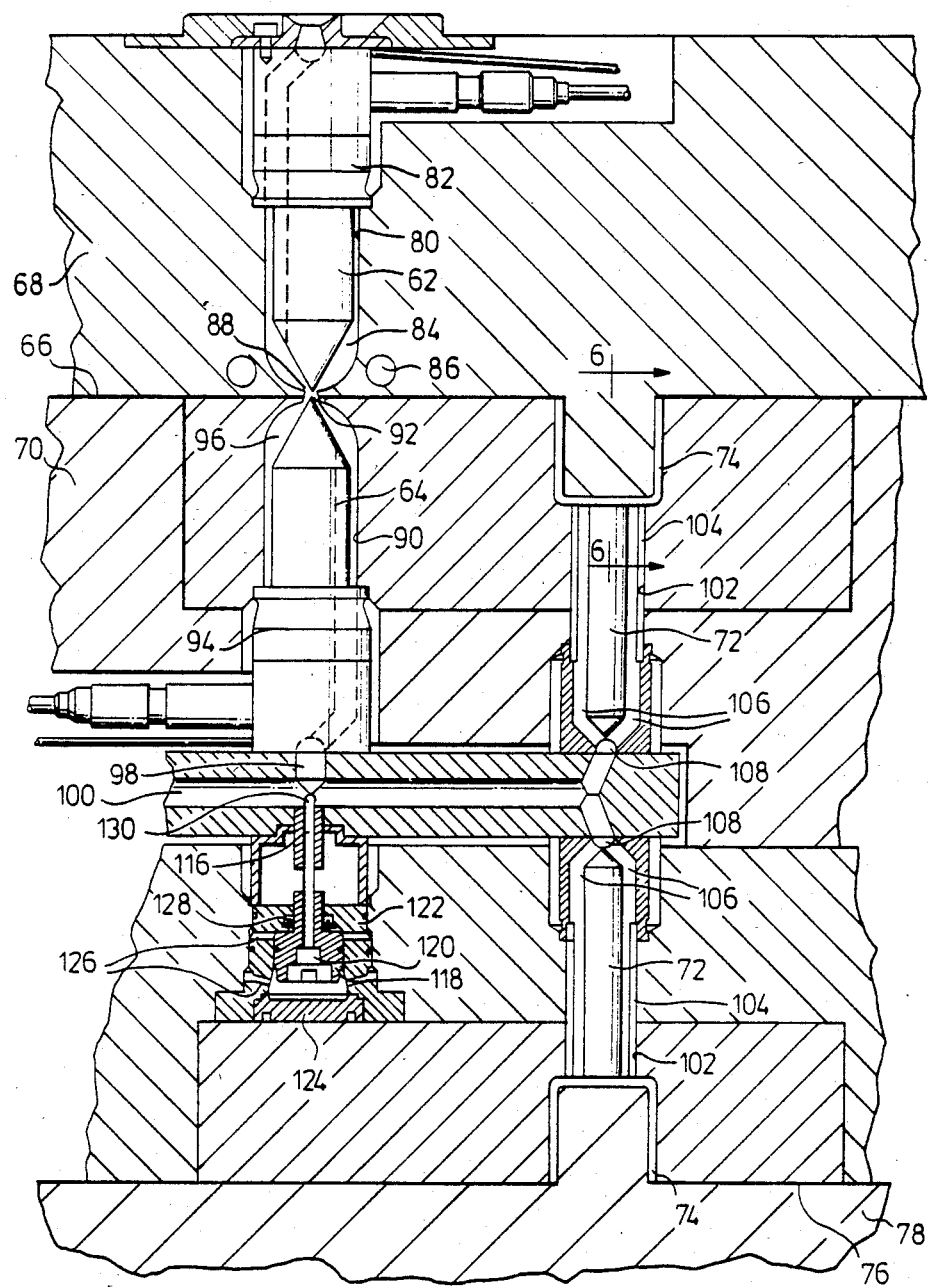
FIG. 5 is a partial sectional view of a portion of a stack molding system according to another embodiment of the invention.

Referring now to FIGS. 5 and 6, a portion of an improved multi-cavity injection molding system is shown which is stack molded without requiring a valve gate to control the transfer of melt through a parting line. As may be seen, the system includes first and second nozzle probes 62,64 as described above which are seated in alignment to bridge the first parting line 66 between the stationary mold platen 68 and the first movable mold platen 70. A number of other heated nozzle probes 72 are seated in the first movable platen 70 to convey melt from a central melt duct 100 to the cavities 74 formed at the first and second parting lines 66,76 between the first movable platen 70 and the stationary platen 68 and a second movable mold platen 78 respectively. The number and type of these other nozzle probes 72 depends upon the system design and the total number of cavities required. In the particular system shown, each of these other nozzle probes 72 is hot edge gated to a pair of cavities 74, but a wide variety of other arrangements can equally as well be used.

The structure of the first and second nozzle probes 62,64 has been described above and need not be repeated. Therefore, elements of these nozzle probes 62,64 common to both embodiments are illustrated and referred to using the same reference numerals. The first nozzle probe 62 is seated in a well 80 in the stationary platen 68. An insulation bushing 82 centrally locates it in the well 80 and provides an insulative space 84 between the hot nozzle probe and the surrounding platen which is cooled by water flowing through cooling elements 86. The central inlet 14 is located to receive pressurized melt from a molding machine (not shown) and the pointed tip 16 is aligned with a tapered gate 88 extending through the stationary mold platen 68.

The second nozzle probe 64 is similarly seated in a well 90 which is located in the first movable mold platen 70 so that a gate 92 extending from it through the first movable mold platen 70 is in alignment with the gate 88 through the stationary mold platen 68. This second nozzle probe 64 is also located in the well 90 by another insulation bushing 94 to provide another insulative space 96 between the hot nozzle probe 64 and the cooled first movable mold platen 70. As will be described below, during use these insulative spaces 84,96 fill up with partially solidified melt which acts as an insulator between the hot nozzle probe and cooled surrounding mold platen. The pointed tip 16 of the second nozzle probe 64 is in alignment with the gates 92 and 88 through the first movable mold platen 70 and the stationary mold platen 68 respectively, and both gates are tapered to form an opening in the closed position which gradually increases in diameter in the direction of flow through it. The opening at the other end of the second nozzle probe 64 which is referred to above as a central inlet 14 is now, in fact, an outlet and is connected by a short conduit 98 to a melt duct 100 extending centrally through the first movable mold platen 70 to distribute the melt to the other nozzle probes 72 leading to the various cavities 74.

Each of these other nozzle probes 72 is also seated in a well 102 in the first movable platen 70 with an insulative space 104 between it and the surrounding cooled platen 70. Each of these nozzle probes 72 has an internal electrical heater (not shown) and a pair of melt passages 106 extending from a central inlet 108 to a number of hot edge gates 110 leading to the cavities 74. As may be seen, the forward end 112 of each of these nozzle probes 72 is generally flat rather than having a pointed tip, but it has intersecting grooves 114 extending across it which connect the melt passages 106 with the edge gates 110. While, in the embodiment shown, each of these nozzle probes 72 supplies a pair of cavities 74 located on opposite sides of the nozzle probe 72 on either the first or second parting lines 66,76, other suitable arrangements may also be used.

As may be seen in FIG. 5, this stack molding system also has a reciprocating pin 116 which is driven by hydraulic actuating mechanism mounted in the first movable mold platen 70. The actuating mechanism includes a piston 118 which is connected to an enlarged driven end 120 of the pin 116 and reciprocates in a cylinder 122. The cylinder has a threaded cap 124 which provides for removal of the piston 118 and pin 116. The piston 118 is driven by a controlled source of pressurized hydraulic fluid (not shown) which is connected on opposite sides of the piston 118 by hydraulic fluid ducts 126. A high temperature seal is provided by a V-shaped seal 128 which is seated in the cylinder 122 to extend around the piston 118 to prevent the escape of pressurized hydraulic fluid. In the forward position, the end 130 of the pin 116 extends into the melt duct 100 in the first movable mold platen 70 to displace some of the melt, for the purpose described below.

In use, the system is assembled as described and shown, and a molding machine (not shown) is located to supply pressurized melt to the inlet 14 of the first nozzle probe 62 according to a predetermined injection cycle in a conventional manner. A source of electrical power is connected at the cold terminals 40 to the leads of only the second heating element 34 in the first nozzle probe 62, and only the first heating element 32 in the second nozzle probe 64. Thus, with the mold in the closed position, injection pressure is applied by the molding machine and melt flows from the inlet 14 of the first nozzle probe 62 through the melt passages 20 and partially open melt channels 22 to the gates 88,92. As mentioned above, these gates 88,92 are aligned in the closed position and are tapered to form an opening which bridges the first parting line and gradually increases in diameter in the direction of flow. The melt flows through the gates 88,92, past the second nozzle probe 64 in the reverse direction and into the central melt duct 100 in the first movable mold platen 70. From here, the melt branches out past the various other nozzle probes 72 and into the cavities 74. When the melt is initially injected into the system, it fills the spaces 84,96 around the first and second nozzle probes 62,64, as well as the spaces around the other nozzle probes 72. While some of it solidifies in this position and provides thermal insulation, sufficient heat is provided in the area of the melt channels 22 to keep them open.

After sufficient melt has been injected to fill the cavities 74, the high injection pressure is held for a short period to pack and then released. During the injection portion of the cycle, hydraulic pressure is applied to reciprocate the pin 116 to its forward position in which its end 130 extends to displace some of the melt in the central melt duct 100 in the first movable platen 70. After the injection pressure is released by the molding machine, the pin 116 is reciprocated to withdraw its tip 130 from the melt duct to further reduce the pressure in the melt duct and even apply a slight suction at the edge gates 110 leading to the cavities 74. After a short cooling period, the mold is opened along the first and second parting lines 66,76, to eject the molded products. The mold is then closed again, injection pressure is reapplied and this cycle is repeated continuously.

As will be apparent, this arrangement of energizing only the second heating element 34 in the first nozzle probe 62 and the first heating element 32 in the second nozzle probe has the result that the pointed tip 16 of the second probe 34 is heated to a substantially higher temperature than that of the first probe 32. It has been found that this has the improvement that it results in a considerable reduction in stringing of the melt when the mold is opening. Furthermore, it has been found that this temperature difference combined with the tapered gates results in a majority of any excess melt that leaks or drools from the gates 88,92 when the mold is open sticking to the hotter side. Consequently, the higher temperature prevents it from hardening into a slug, and it is therefore readily reabsorbed into the system when the mold is closed.

Although the description of this improved injection molding apparatus has been given with respect to particular embodiments of the invention, it is not to be construed in a limiting sense. Variations and modifications will occur to those skilled in the art. For instance, it will be apparent that both heating elements 32,34 of the second nozzle probe 64 may be energized in the stack molding system shown in FIG. 4. Similarly, only one of the gates 88,92 may be tapered in the forward direction. While the inner heating element 32 is shown as extending into the pointed tip 16 of each nozzle probe rather than the outer heating element 34, this could be reversed. For a definition of the invention, reference is made to the attached claims.

What I claim is:

1. Stack injection molding apparatus for conducting melt from a fixed platen to a movable platen, where said platens are actuated according to an operating cycle between open and closed positions, comprising:
   (a) a first heated elongated nozzle probe seated in the fixed platen, said first nozzle probe having a pointed tip in alignment with a first gate extending through the fixed platen, the first nozzle probe having at least one melt passage extending to convey pressurized melt from an inlet in said first nozzle probe to the first gate; and
   (b) a second heated elongated nozzle probe seated in the movable platen, said second nozzle probe having a pointed tip in alignment with a second gate extending through the movable platen, the first gate through the fixed platen connecting with the second gate through the movable platen in the closed position, the second nozzle probe having at least one melt passage extending to convey pressurized melt from the second gate to a melt duct in the movable platen;

the first and second nozzle probes each having first and second electrical heating elements extending longitudinally along the melt passage, the first heating element having a portion extending into the pointed tip of the respective nozzle probe and the second heating element terminating short of the pointed tip, including an electrical power source which is connected to energize only the second heating element in the first nozzle probe and at least the first heating element in the second nozzle probe, whereby the pointed tip of the second nozzle probe is heated to a higher temperature than the pointed tip of the first nozzle probe to reduce stringing of the melt when the movable platen is actuated to the open position.

2. Stack injection molding apparatus as claimed in claim 1 wherein the second gate extending through the movable platen is tapered to gradually increase in diameter towards the pointed tip of the second nozzle probe.

3. Stack injection molding apparatus as claimed in claim 2 wherein the first gate through the fixed platen is in alignment with the second gate through the movable platen, and both gates are tapered to form an opening in the closed position which gradually increases in diameter towards the pointed tip of the second nozzle.

4. Stack injection molding apparatus as claimed in claim 1 wherein only the first heating element is energized in the second nozzle probe.

* * * * *